June 10, 1969
F. H. BRATTON ET AL
3,449,193
METHOD OF BONDING POLYIMIDE FILMS
Filed March 7, 1966
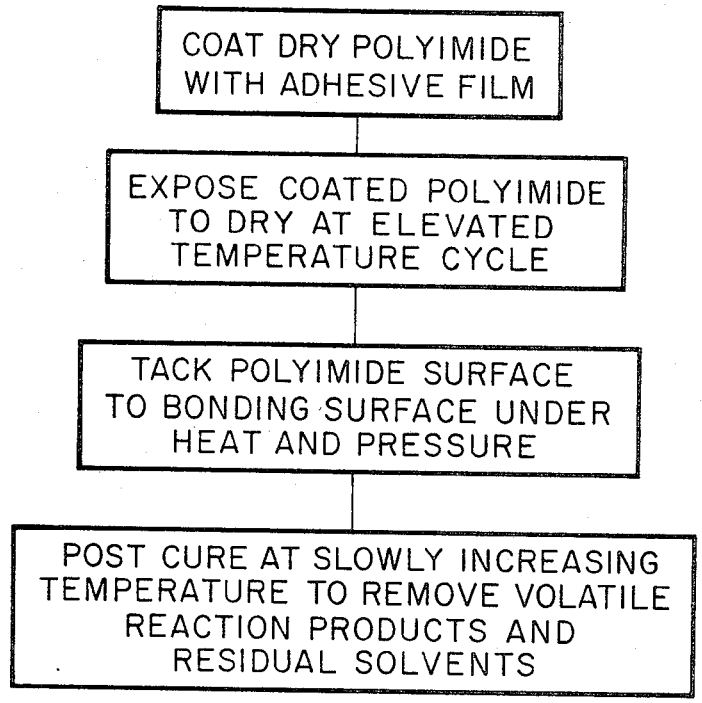
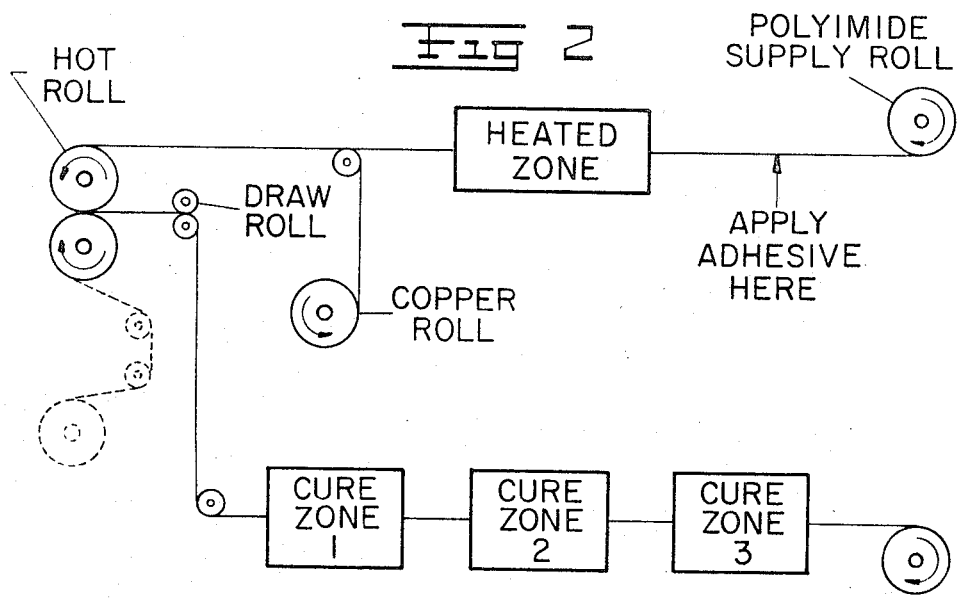
INVENTORS
FRANCIS H. BRATTON
HERBERT J. FICK
BY KENNETH W. KLIMISCH
*Meyers & Peterson*
ATTORNEYS United States Patent Office 3,449,193
Patented June 10, 1969

3,449,193
METHOD OF BONDING POLYIMIDE FILMS
Francis H. Bratton, Herbert J. Fick, and Kenneth W. Klimisch, Northfield, Minn., assignors to G. T. Schjeldahl Company, Northfield, Minn., a corporation of Minnesota
Filed Mar. 7, 1966, Ser. No. 532,146
Int. Cl. B32b 15/08, 31/26
U.S. Cl. 156—322                7 Claims The present invention relates generally to the preparation of an improved adhesive bond between films of polymeric poly(imide-amide) materials which are known for their high temperature capabilities. The bonding technique of the present invention enables the high temperature capability to be extended to these films in adhesively bonded form.

Polymeric poly(imide-amides), or polyimides as they are sometimes referred to herein, as a general class of materials have been known for many years. Reference is made to U.S. Patents 2,149,286, 2,407,896, 2,421,024 and 2,502,576, A.P.C. patent application Ser. No. 389,002. Polyimides having exceptional capabilities at high temperatures are disclosed in U.S. Patent 2,710,853, these high temperature polyimides being prepared from an aromatic dianhydride such as pyromellitic dianhydride together with an aromatic diamine, and particularly 4,4′ diamino diphenylether or para-phenylenediamine. Polyimides of the type disclosed in these various patents are available commercially in several forms, cured films, partially reacted resins, etc.

For satisfactory adhesive bonding of these materials, it is naturally preferable that the adhesive film be one which has high temperature capabilities equivalent to those of the polyimide or other bodies being bonded. It has been found that an adhesive can be utilized which consists essentially of a polyimide type substantially equivalent to that of the high temperature polyimide structures being bonded. In this connection, however, the adhesives are preferably carried in a solvent in order to enable the proper application to the polyimide or other surface being bonded. One of the properties of polyimides, particularly those of polybasic aromatic acids and aromatic diamines is their reasonable permeability to certain solvents, such as, for example, dimethyl sulfoxide (DMSO), dimethyl formamide (DMF), dimethylacetamide (DMAC) and sometimes in acetone or the like. One additional property of these polyimides, is their relatively high permeability to water vapor. As in conventional adhesive bonding techniques, it is frequently essential that the solvent be entirely or substantially entirely removed from the adhesive solids during the curing cycle.

In high temperature work, and particularly in those instances where the base material is to be subjected to high temperature environments, careful removal of solvents, suspending agents, and products of reaction are essential toward obtaining a lasting and suitable bond. In this regard, any residual solvent which has not been removed prior to exposure to an elevated temperature may cause a failure to develop in a bonding area. For example, if films of polyimides are bonded together by suitable adhesives, these films will delaminate upon subsequent exposure to high temperature when solvent removal has not been carefully carried out. In accordance with the present invention, solvent removal is accomplished in a manner which permits the polyimide structures including film structures and the like comprising the laminate bodies, to be exposed to relatively high temperatures subsequent to curing, these subsequent temperature exposures being frequently substantially higher than those temperatres encountered in the curing cycle. In the concept of the present invention, however, these subsequent exposures to relatively higher temperatures have been encountered without any deleterious effect on the laminate.

In accordance with the present invention, the polyimide material which is being bonded, such as, for example, a thin film of a polyimide having a thickness in the range of about 1 to 3 mils, is covered with a film of adhesive, the solids comprising the adhesive structure preferably being of the same structure as the polyimide film or base material. This adhesive which normally contains a solvent, is initially exposed to a relatively sharp initial elevated temperature level. The reason for this initial high temperautre exposure is to create a situation wherein a substantial portion of the solvent may be rapidly removed from the adhesive film without necessarily creating a condition wherein the film is entirely cured, or at least substantially entirely cured along the surface portions. Again, it is felt that this particular exposure brings the adhesive medium to a point approaching the knee of the curing cycle, without actually exceeding this knee or inflection point. Subsequent to the initial exposure, the material is wrapped for an appropriate time cycle about a heated or hot-roll, the time of contact with the hot roll being dependent, of course, upon the temperautre of the roll and the heat of the operation. At the end of this wrap, and while on the surface of the roll, the material is passed through a nip wherein contact is made and a bond is formed with the other member to which the bond will be made.

Subsequent to the passing of the material through the nip, the bonded material is exposed to an appropriate ultimate heating or curing cycle wherein the adhesive portion of the composite member is finally cured. During this ultimate curing cycle, the adhesive is enclosed between a pair of members, at least one of which is permeable to the solvent vapor, and the temperature is very slowly raised to an appropriate point to completely cure the material, this being accomplished without causing any delaminating or bubbling to occur between the individual members being bonded. It will be appreciated that this delamination or bubbling can be an extremely undesirable feature or even destructive for laminates which may be employed for electrical purposes. Obviously, because of the desirable high temperature properties and reasonable electrical properties of this material, certain electrical uses or applications are appropriate.

Therefore, it is an object of the present invention to provide an improved technique for bonding polyimide materials, particularly those polyimides prepared of the reaction product of dibasic or multibasic aromatic acids or their dianhydrides, and aromatic diamines.

It is yet a further object of the present invention to provide a high temperature bonding system for use in connection with polyimides prepared as the reaction product of dibasic or multibasic aromatic acids and aromatic diamines.

It is yet a further object of the present invention to provide an improved adhesive bonding technique for polyimides prepared as a reaction product of dibasic or multibasic aromatic acids or their anhydrides, and aromatic or aromatizable diamines, the adhesive bonding material comprising as its solids content, a similar type of unreacted polyimide, such as in a polyamic acid form dispersed in a suitable solvent.

Other and further objects of the present invention will become apparent to those skilled in the art upon a study of the following specification, appended claims, and accompanying drawing wherein:

FIGURE 1 is a flow diagram showing the steps carried out in connection with the present invention;

FIGURE 2 is a schematic illustration of a typical system utilized in conducting the various operations involved in the present invention.

In accordance with the preferred modification of the present invention, the preferred high temperature polyimide, having permeability to a number of solvents, and also be permeable to water vapor is that polyimide prepared from pyromellitic acid and an aromatic diamine such as paraphenylene-diamine, which is the preferred diamine or its analog metaphenylenediamine, or benzidine, 4-4′ diamino diphenyl methane, 4-4′ diamino diphenyl ether, 4-4′ diamino diphenyl sulphide, 4-4′ diamino diphenyl sulfone. These polyimides are, as previously indicated, a polyimide of the type which is being used as the polyimide base material, however it will be appreciated that any polyimide prepared from the group indicated hereinabove could be successfully employed as the adhesive bonding medium. The materials being bonded are brought together in their bonding relationship in accordance with the operations shown in FIGURE 1, and may be expeditiously carried out in the apparatus illustrated schematically in FIGURE 2.

With specific reference therefore, to FIGURE 2 a copper-polyimide film laminate is prepared wherein individual rolls of copper and polyimide film are available, where indicated in the legend. The polyimide film is treated or coated with a film of an adhesive, the adhesive preferably having a structure substantially comparable to that of the polyimide, the coated film thereafter being passed through a heated or drying zone which is ventilated and which has a sharp elevated temperature level, or alternatively to a temperature inversion characteristic wherein the film initially is exposed to a relatively high temperature, and thereafter is exposed to a temperature which is somewhat lower. Specifically, the polyimide or polyimide (amide) is the reaction product of pyromellitic anhydride and 4,4′ diamino diphenylether and dispersed as 50% solids or less in a solvent of DMSO, DMF, DMAC or acetone mixtures of these solvents, which polyimides are commercially available. Generally, the temperature in the initial treating zone is of the order of about 350° F., this temperature in certain cases being decreased gradually to about 200° F., the entire period of exposure being between 2 and 15 minutes. In this initial curing cycle, the temperature should substantially reach but not greatly exceed the boiling point of the solvent used in the system, and it has been found that a temperature of 350° F., is appropriate for a solvent of DMSO which has a boiling point of about 372° F. or DMAC which has a boiling point of about 325° F. This heat treating cycle has been found to reduce the quantity of solvent in the polyimide adhesive film without adversely affecting the chracteristics of the film, such as, for example, by hardening or curing the surface portions thereof. The treated adhesive film therefore retains a smooth open, even texture. Subsequent to the initial heating and drying treatment, contact is made with the material to which the bond is to be made; in the example shown, copper. Of course, the adhesive functions well for bonding other metals, such as aluminum, constantan, chromel, or the like. The copper and film are brought together, where indicated, and are passed over about 180° of hot-roll. This particular hot-roll has a diameter of about 6 inches, and is maintained at a temperature of between 380° F. and 500° F., a particularly desirable temperature for this material in DMSO solvent being 430° F. The copper surface is preferably brought into contact with the hot-roll, however it is appreciated that the polyimide film could be contacted with the hot-roll just as well. After traversing the 180° on the surface of the roll the material is then pressed in a nip formed by a cooperating resilient roll after which the material is brought through the draw rolls, where indicated. Subsequent to this operation, the material may be re-wound on a take-up roll for subsequent heat treatment, or may, in the alternative, be passed through a series of curing cylces, wherein the ultimate cure is accomplished. In the schematic illustration, the curing cycle occurs in three progressive steps, the first being an exposure to a temperature of about 250° F. for one hour, the second stage being an exposure to a temperature of about 300° F. for one hour, the third zone constituting an exposure to a temperature of about 350° F. for three hours. This curing cycle may therefore be defined as one wherein the temperature of the laminate is brought extremely slowly to an elevated temperature of about 350° F. This is sufficient to cure the polyimide(amide) adhesive, and is also sufficient to remove any residual solvent which may remain in the system.

As shown in phantom in FIGURE 2, the copper may be supplied at the nip roll area. Of course, in this modification, the adhesive must be supplied to the polyimide supply along a surface and at a point where it will not be in actual contact with the hot-roll.

If the solvent is other than DMSO, it is necessary to tailor the temperature of the curing cycles slightly, it being remembered that the polyimide adhesive could not reasonably be exposed to temperatures over about 500° F. during this final curing or post-curing cycle.

This curing cycle shown is for an adhesive film having a cured thickness of about ½ mil. Obviously, if thicker adhesive films are being utilized, a somewhat greater time-temperature cure cycle should be employed. These cycles will be readily apparent to those skilled in the art.

If multiple layer laminates are being considered, that is with more than two layers, the aspects of the present invention may be employed consecutively by curing one layer of an adhesive at a time. This process will build up multiple layers, as desired, without a subsequent operation adversely affecting any previously prepared bonding area.

It has been indicated that the material, after being tacked on the hot roll, may be stored prior to the step post-cure. In this connection, the material should be stored in a low humidity container until it is desired to complete the post-cure, this being necessary because of the tendency of polyimide films of the type under consideration to absorb and retain water. If the material is exposed to high humidity, and subjected to the post cure cycle immediately thereafter, bubbling may occur during the post cure cycle due to the presence of absorbed water. However, in the event high humidities are encountered, drying in a low humidity environment prior to post-cure will normally eliminate bubbling.

In the event the viscosity of the polyimide adhesive is desired to be dfferent from that of the fluid material, it may enhance the coverage if a powdered silicate such as a metal silicate is mixed with the adhesive film. Material of this type is available commercially. While ordinary copper can be utilized, it may be found that the adhesion of the copper to the polyimide film could be enhanced by utilizing a copper with black oxide on the film to be bonded, this type of copper being commercially available as "Treatment A" copper, or formed by treatment with hot aqueous solutions of an alkali such as sodium or potassium hydroxide and a chlorite such as sodium or potassium chlorite.

While the specific example given utilizes copper together with a polyimide film, it is sometimes possible to encapsulate a polyimide film between oppositely disposed layers of a metal such as copper. In this case, the exposed film is not permeable to the vapors of the solvents encountered, and care must be taken to insure that there are adequate open areas exposing the polyimide to atmosphere such as by removing portions of the copper as in printed wiring and that the materials are dry. In other words, geometric porosity or porosity obtained from chemical permeability of the film may be utilized to disipate the residual solvent. Such porosity must be present, however. The post-cure cycle moves progressively as previously indicated. Also, it may be desirable in certain instances to use a somewhat higher temperature in the hot-roll operation, such as a temperature not less than about 470° F., and not more than about 500° F. It has been generally found that blistering will not occur even when impermeable films are utilizied on certain small areas of the outer surface of the polyimide adhesive film. As an alternative to the black oxide copper mentioned hereinabove, a copper film which has been cleaned and annealed may be used successfully. In one specificaembodiment, the copper is brought to red-heat temperature, and immediately thereafter quenched in water. The copper is then dried, and bonded to the polyimide film prior to its exposure to substantial quantities of oxygen containing air.

The individual requirements of the adhesive bonding operation will normally dictate the thickness of the adhesive film to be utilized, however for most applications it has been found that an adhesive film thickness of about ½ mil (dried) will be adequate.

The adhesive film which is obtained commercially is normally in the polyamic acid form. Treatment of high temperatures converts the polyamic acid to the poly (imide-amide) form. The reaction is one which splits off water, and hence it has been found difficult to form adhesive bonds without encountering some delamination in the process, and particularly on a roll-to-roll basis. The technique of the present invention permits the conversion of the polyamic acid to the poly(imide-amide) form with its consequent splitting of water, without degradation of the bond being formed. The technique is thus readily adaptable to production on a roll-to-roll basis.

Typical 90° peel test results for adhesive bonds of copper to poly(imide-amide) films at various temperatures are as follows:

| Temperatures, ° F.: | Pounds per inch peel strength |
|---|---|
| 70 | 3.4 |
| 150 | 2.7 |
| 300 | 3.0 |
| 400 | 4.0 |

The 90° peel strength after 15 hours exposure to 500° F. temperatures was found to be 4.8 pounds per inch. The tests for peel were conducted with $\frac{1}{16}$ inch conductors on a poly(imide-amide) film.

The electrical properties of the laminate are readily appreciated. The high temperature capability of the polyimide renders the material highly desirable for soldering operations such as are normally encountered in electrical applications. Another feature of the invention is the low shrinkage characteristic of the resulting laminate material. It has been found that this materially normally shrinks an average of less than about 0.2 percent.

The insulation resistance of the material has been found to be generally in the range of about $6.5 \times 10^5$ megohms. The test specifically included a preconditioning for seven days under the conditions defined in ASTM D–618, and the conductors were 6 inches long, 0.062 inch wide on 0.100 inch center. Forty-five volts were applied to the material during conditioning, and 100 volts applied during the test.

We claim:
1. The method of curing a raw adhesive film consisting essentially of a polyamic acid confined between two barrier layers at least one of which has porosity for water vapor and for residual solvent in said raw adhesives, said method comprising:
 (a) subjecting a film of exposed raw adhesive to a temperature in the range of between about 250° F.–350° F. for a period of several minutes;
 (b) exposing said film to a second temperature in the range of about 300° F.–500° F. for a period of about ¼ to about 3 minutes, and tacking said film to a surface of a member to be bonded thereto while at said elevated temperature;
 (c) post-curing said adhesive film by exposure to a treating zone wherein the temperature increases at a slow rate from about 250° F. to about 450° F., said exposure being continued for a period of between about 3 to 8 hours.

2. The method as set forth in claim 1 wherein at least one of said barrier layers is permeable to water vapor and adhesive solvent.

3. The method as set forth in claim 1 being particularly characterized in that said technique is carried out in a roll-to-roll basis.

4. The method as set forth in claim 1 being particularly characterized in that said exposure in said first treating zone removes at least about 75 percent of the solvent in the adhesive system.

5. In an apparatus for curing films of a polyamic acid disposed along a surface and comprising:
 (a) means for applying a film of a polyamic acid along the surface of a body to be treated,
 (b) means for exposing said film to a temperature exposure cycle wherein the temperature during exposure is maintained at a level of between about 300° F. and 400° F., to
 (c) means for tacking said polymeric acid film to a second surface under pressure while at a temperature of between about 400° F. and 500° F., and
 (d) means for post-curing said tacked film at slowly increasing temperatures ranging from an initial level of about 250° F. to 300° F. and thereafter slowly increasing said temperature up to about 450° F., said temperature increase of said post cure being conducted substantially uniformly.

6. Apparatus as defined in claim 5 wherein said means for post curing said tacked film includes a plurality of individual heated zones.

7. The method of curing a raw adhesive film consisting essentially of a polyamic acid confined between two barrier layers at least one of which has porosity for water vapor and for residual solvent in said raw adhesives, said method comprising:
 (a) subjecting a film of exposed raw adhesive to a temperature in the range of between about 250° F.–350° F. for a period of several minutes and thereafter slowly decreasing the temperature to a range of between about 200° F. to 250° F.;
 (b) exposing said film to a second temperature in the range of about 300° F.–500° F. for a period of about ¼ to about 3 minutes, and tacking said film to a surface of a member to be bonded thereto while at said elevated temperature;
 (c) post-curing said adhesive film by exposure to a treating zone wherein the temperature increases at a slow rate from about 250° F. to about 450° F., said exposure being continued for a period of between about 3 to 8 hours.

References Cited
UNITED STATES PATENTS

| 2,944,993 | 7/1960 | Brebner et al. | 260—37 |
| 3,261,811 | 7/1966 | Tatum | 260—47 |
| 3,361,589 | 1/1968 | Lindsey | 117—118 |
| 3,371,009 | 2/1968 | Traynor et al. | 161—227 |

EARL M. BERGERT, *Primary Examiner.*

D. J. FRITSCH, *Assistant Examiner.*

U.S. CL. X.R.

156—324, 331, 499, 555